(12) United States Patent
Ferguson

(10) Patent No.: US 10,241,530 B2
(45) Date of Patent: Mar. 26, 2019

(54) CONTROLLING HEAT CAPABILITY OF APPLIANCE ACCORDING TO USER PROXIMITY AND NOTIFYING REMOTE USERS VIA INTERNET FOR INCREASED SAFETY

(71) Applicant: William MacDonald Ferguson, Kelowna (CA)

(72) Inventor: William MacDonald Ferguson, Kelowna (CA)

( * ) Notice: Subject to any disclaimer, the term of this patent is extended or adjusted under 35 U.S.C. 154(b) by 37 days.

(21) Appl. No.: 15/486,493

(22) Filed: Apr. 13, 2017

(65) Prior Publication Data
US 2017/0329358 A1    Nov. 16, 2017

(30) Foreign Application Priority Data
May 10, 2016 (CA) ...................................... 2929530

(51) Int. Cl.
*F24C 3/12* (2006.01)
*G05B 19/042* (2006.01)
(Continued)

(52) U.S. Cl.
CPC ......... *G05D 23/1951* (2013.01); *F24C 3/124* (2013.01); *G05B 19/042* (2013.01);
(Continued)

(58) Field of Classification Search
CPC .................. F24C 3/124; G05B 19/042; G05B 2219/2613; G05D 23/1917; G05D 23/1951; H04L 12/1895; H04L 67/10
See application file for complete search history.

(56) References Cited

U.S. PATENT DOCUMENTS

| 4,775,913 A | 10/1988 | Ekblad |
| 5,380,985 A | 1/1995 | Graham |

(Continued)

FOREIGN PATENT DOCUMENTS

CA    2152015    12/1996

OTHER PUBLICATIONS

Wallflower, "Wallflower keeps your family safe", downloaded from http://wallflower.com/index.html on May 18, 2016.

*Primary Examiner* — Yuhui R Pan
(74) *Attorney, Agent, or Firm* — Spencer Fane LLP; Steven J. Laureanti

(57) ABSTRACT

A stove controller starts an unattended timer when a cooking process is started. The controller monitors whether motion is detected in the kitchen prior to the unattended timer expiring and resets the unattended timer each time motion is detected. If the unattended timer expires without any motion being detected, the controller disables the heating elements of the stove and starts a return timer. The controller monitors whether motion is detected in the kitchen prior to the return timer expiring. When motion is detected, the controller automatically re-enables the heating elements of the stove so that cooking can continue. If motion is not detected and the return timer expires, the controller locks the stove until a reset procedure is performed. Alerts of the stove activity are sent to external devices over the Internet, and the reset procedure may be performed on the controller or on one of the external devices.

20 Claims, 6 Drawing Sheets

(51) Int. Cl.
  *G05D 23/19* (2006.01)
  *H04L 12/18* (2006.01)
  *H04L 29/08* (2006.01)
  *H04L 12/46* (2006.01)
  *A47J 36/32* (2006.01)

(52) U.S. Cl.
  CPC ..... *G05B 19/0428* (2013.01); *G05D 23/1917* (2013.01); *H04L 12/1895* (2013.01); *H04L 12/4625* (2013.01); *H04L 67/22* (2013.01); *H04L 67/24* (2013.01); *A47J 36/32* (2013.01); *G05B 2219/2613* (2013.01); *H04L 67/10* (2013.01)

(56) References Cited

U.S. PATENT DOCUMENTS

| | | | |
|---|---|---|---|
| 5,717,188 A | 2/1998 | Vaillancourt | |
| 6,130,413 A | 10/2000 | Rak | |
| 2008/0255919 A1* | 10/2008 | Gorder | G06Q 10/06 705/7.13 |
| 2015/0161835 A1* | 6/2015 | Jablokov | G07C 9/00111 340/5.61 |

* cited by examiner

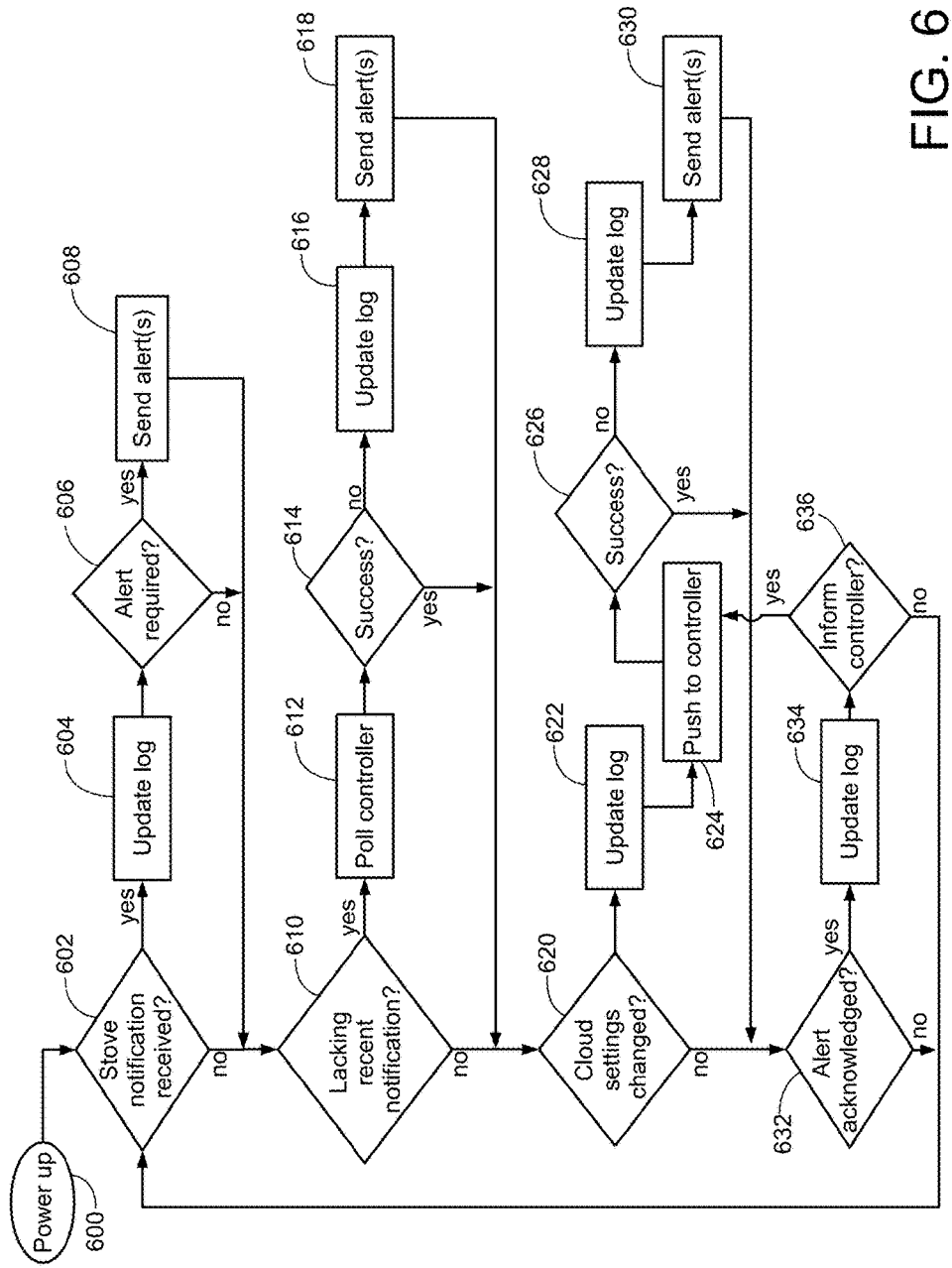

CONTROLLING HEAT CAPABILITY OF APPLIANCE ACCORDING TO USER PROXIMITY AND NOTIFYING REMOTE USERS VIA INTERNET FOR INCREASED SAFETY

CROSS-REFERENCE TO RELATED APPLICATIONS

This application claims the benefit of priority of Canadian Patent Application No. 2,929,530 filed May 10, 2016, which is incorporated herein by reference.

BACKGROUND OF THE INVENTION

(1) Field of the Invention

The invention pertains generally to kitchen cooking appliances that generate heat such as stoves, ovens, cooktops, and ranges. More specifically, the invention relates to preventing fires and generally increasing safety by automatically enabling and disabling the ability of a cooking appliance to generate heat.

(2) Description of the Related Art

Common domestic stoves do not include many safety features. Typical electric burners and ovens continue generating heat indefinitely when turned on. Built in cook timers can be activated by the user to automatically shut off an oven after a desired bake time is reached, but such timers are effective as a rudimentary safety feature if and only if the user remembers to manually set the timer at the start of all cooking sessions.

Overcooked food will smoke or burn, and may lead to property damage, personal injury and even loss of life. Although kitchen safety is important for everyone, safety concerns are increased when the person operating the cooking appliance is prone to forgetfulness. For instance, a senior citizen living on their own may have onset dementia or other medical conditions that cause family members to question whether independent living is still appropriate. Often all parties involved may desire to keep the status quo because of the independence home cooking allows; however, the fact that ovens and stoves are dangerous when not properly operated is a legitimate worry.

Proposals have been made for systems which turn off a stove after a predetermined time in absence of operator activity in the vicinity of the stove. For instance, U.S. Pat. No. 6,130,413 issued Oct. 10, 2000 discloses a safety device utilized in conjunction with an existing cooking stove. While allowing continuous operation of an electric clock and other auxiliary functions of the stove, the safety device automatically shuts off the heating elements of the stove after a predetermined time of failing to detect the presence of a person in the vicinity of the stove.

BRIEF SUMMARY OF THE INVENTION

According to an exemplary embodiment of the invention there is disclosed a system, apparatus, and method of preventing fires and generally increasing safety by automatically enabling and disabling the ability of a cooking appliance to generate heat.

According to an exemplary embodiment of the invention there is disclosed a system for notifying remote users of lack of user presence around an appliance that is generating heat. The system includes a switch selectively limiting flow of a power source to the appliance according to a control signal, a controller coupled to the switch and generating the control signal, a sensor coupled to the controller and detecting presence of a user in a proximity of the appliance, and a network interface of the controller coupled to a computer network. The controller starts an unattended timer after heat generation is started by the appliance. The controller restarts the unattended timer each time the sensor detects the user is within the proximity of the appliance while heat generation by the appliance is enabled. In response to the unattended timer reaching a predetermined expiry duration while heat generation by the appliance is enabled, the controller controls the control signal to disable heat generation by the appliance and sends one or more alert notifications via the computer network.

According to another exemplary embodiment of the invention there is disclosed a method of notifying remote users of lack of user presence around an appliance that is generating heat. The method includes selectively limiting flow of a power source to the appliance according to a control signal, starting an unattended timer after heat generation is started by the appliance, and detecting presence of a user in a proximity of the appliance. The method further includes restarting the unattended timer each time the user is detected within the proximity of the appliance while heat generation by the appliance is enabled. In response to the unattended timer reaching a predetermined expiry duration while heat generation by the appliance is enabled, the method further includes controlling the control signal to disable heat generation by the appliance and sending one or more alert notifications via a computer network.

According to another exemplary embodiment of the invention there is disclosed a controller for notifying remote users of lack of user presence around an appliance that is generating heat. The controller includes one or more processors executing software instructions thereby causing the one or more processors to performs steps of starting an unattended timer after heat generation is started by the appliance, detecting presence of a user in a proximity of the appliance, and restarting the unattended timer each time the user is detected within the proximity of the appliance while heat generation by the appliance is enabled. In response to the unattended timer reaching a predetermined expiry duration while heat generation by the appliance is enabled, the one or more processors perform the steps of generating a control signal to disable heat generation by the appliance and sending one or more alert notifications via a computer network.

These and other advantages and embodiments of the present invention will no doubt become apparent to those of ordinary skill in the art after reading the following detailed description of the preferred embodiment that is illustrated in the various figures and drawings.

BRIEF DESCRIPTION OF THE DRAWINGS

The invention will be described in greater detail with reference to the accompanying drawings which represent preferred embodiments thereof:

FIG. 6 shows a flowchart of operations performed by the cloud server of FIG. 1.

DETAILED DESCRIPTION

Figure 1:
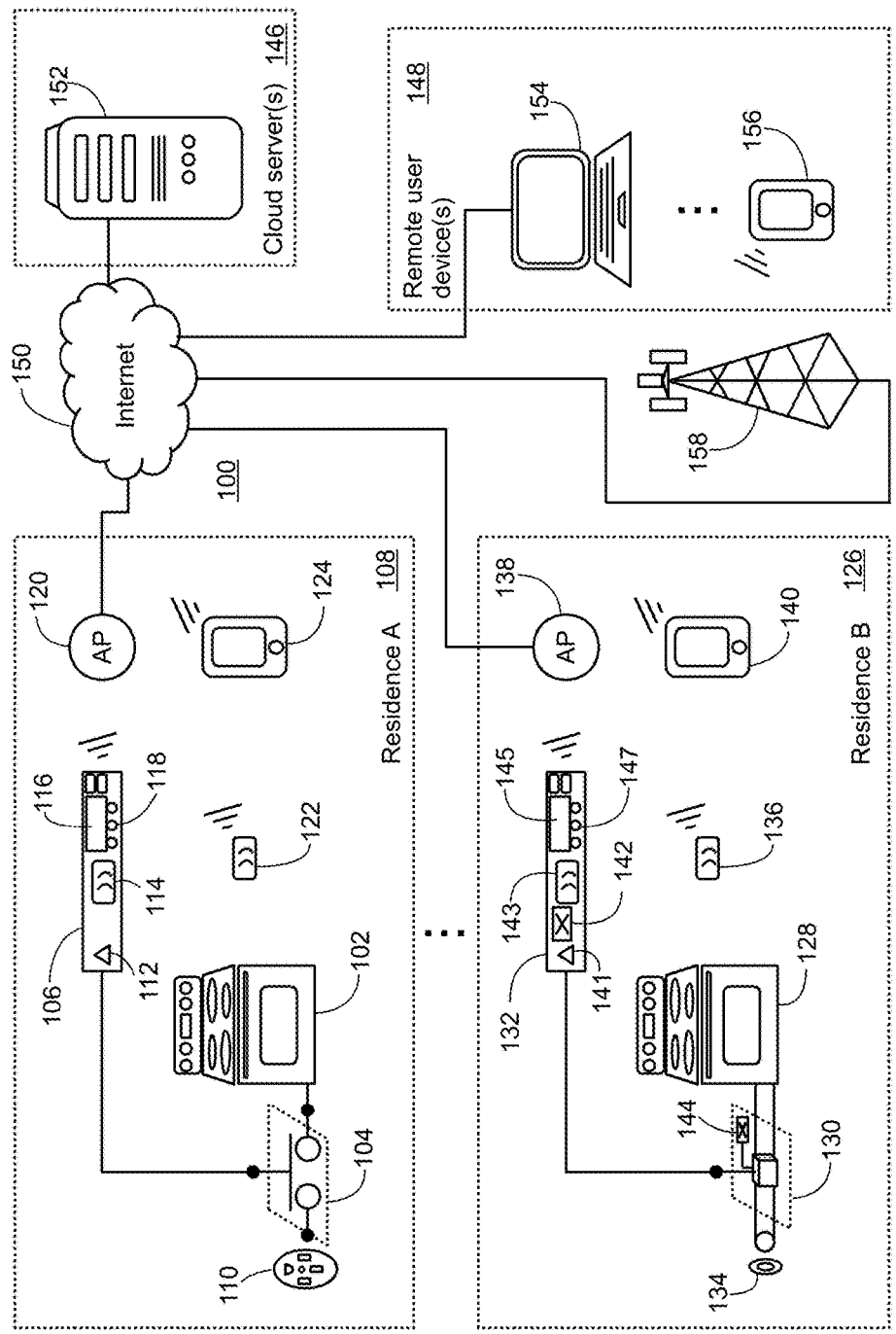
FIG. 1 shows a block diagram of a system for automatically enabling and disabling the ability of cooking appliances to generate heat according to an exemplary embodiment of the invention.

FIG. 1 shows a block diagram of a system 100 for automatically enabling and disabling the ability of cooking appliances to generate heat according to an exemplary embodiment of the invention.

The system 100 includes an electric-powered cooking appliance such as an electric range 102 coupled to a power switch 104 and a controller 106 within a first residence 108. The power switch 104 controls electrical power transfer from an electrical socket 110 to the range 102 according to control signals received from the controller 106. The controller 106 includes an emergency button 112, a primary motion sensor 114, and a user interface (UI) including a screen 116 and a plurality of buttons 118. The controller 106 further includes a wireless module that sends and receives wireless signals to/from an access point (AP) 120, which may be a Wi-Fi router installed in the first residence 108. One or more secondary motion sensors 122 are installed in other areas of the residence 108, and a user device such as a mobile phone 124 is wirelessly coupled to the access point 120.

A second residence 126 in this example includes a gas-powered cooking appliance such as a gas range 128, and the gas range 128 is coupled to a power switch 130 and a controller 132. In the second residence 126, the power switch 130 controls gas flow from a gas source 134 to the range 128 according to control signals received from the controller 132. The other components installed in the second residence 126 are similar to as previously described for the first residence 108 including one or more secondary motion sensors 136, an access point (AP) 138, and a user's mobile phone 140. Likewise, the controller 132 in the second residence 126 includes each of the elements previously described for the controller 106 in the first residence including an emergency button 141, a primary motion sensor 143, and a user interface including a screen 145 and buttons 147. Further, since the second residence 126 has a gas-powered range 128, the controller 132 further includes an upper gas sensor 142, and the gas power switch 130 in this configuration includes a lower gas sensor 144.

The system 100 further includes one or more cloud servers 146 and remote user devices 148 coupled to the Internet 150. In this embodiment, a single cloud server 152 is shown along with two remote user devices 148 including a laptop computer 154 and mobile phone 156. It is to be understood that any number of cloud servers 146 and remote user devices 148 may be utilized with system 100 and the numbers of these devices 146, 148 may dynamically change during operation.

Figure 2:
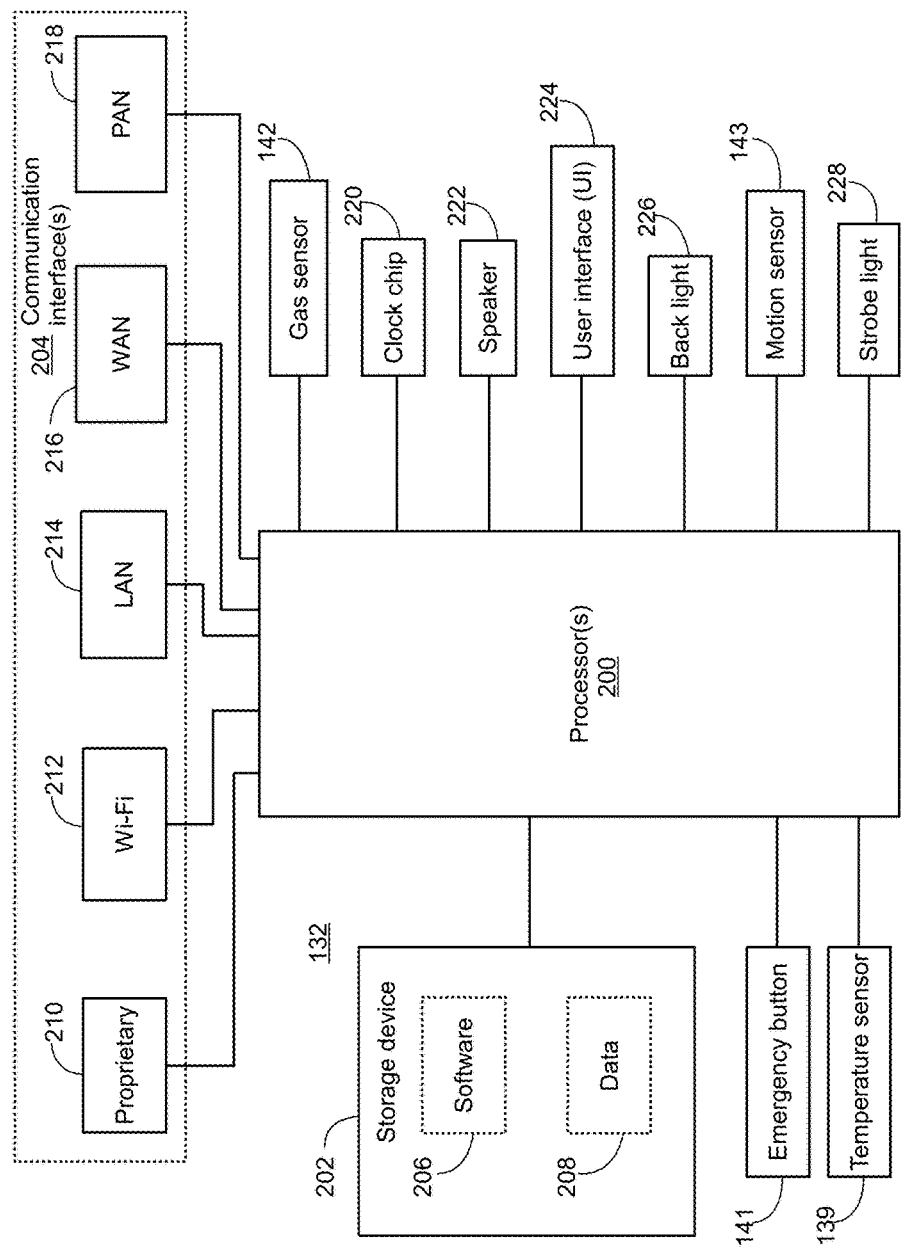
FIG. 2 shows a block diagram of the controller in the second residence of FIG. 1.

FIG. 2 shows a block diagram of the controller 132 in the second residence 126 according to an exemplary embodiment. The controller 132 includes one or more processors 200 coupled to a storage device 202 and a plurality of communications interfaces 204. In the following description, the singular form of the word "processor" will be utilized as it is common for an embedded CPU of a computing device to have a single processor 200 (sometimes also referred to as a core); however, it is to be understood that multiple processors 200 may also be configured to perform the described functionality of the controllers 106, 132 in other implementations.

The storage device 202 stores software instructions 206 such as application programs for execution by the processor 200 along with data 208 utilized and created by the processor 200 while executing the software 200. The communication interfaces 204 in this example include a proprietary interface 210 for transmitting and receiving signals between the power switch 130 and the controller 132. The communication interfaces 204 further include a Wi-Fi interface 212 for wirelessly coupling the controller 132 to the access point 138. In general, any desired communication interface(s) may be included for interfacing with the power switch 130 and/or external devices; examples of interfaces 204 include a local area network (LAN) interface 214 including wired Ethernet, a wide area network (WAN) interface 216 including global system for mobile communications (GSM) or other mobile data interfaces, and a personal area network (PAN) interface 218 including a Bluetooth module for communicating with devices in proximity to the controller 132 such as the user's mobile phone 140 and/or the secondary motion sensors 136. The illustrated communication interfaces 204 are exemplary; in other embodiments, different interfaces 204 may be utilized as desired. For example, an X10 interface can be utilized to provide communication and control via the household power lines within a particular residence 108, 126.

The controller 132 also includes a clock chip 220 for tracking time, a speaker 222 for sounding audible reminders and warnings, a user interface (UI) 224 including the screen 145 and buttons 147 allowing a local user to interact with the controller 132, a back light 226 allowing the user to see the UI 224 even in low light conditions, the primary motion sensor 143 for detecting motion in proximity to the controller 132, a strobe light 228 for flashing visual reminders and warnings, a temperature sensor 139 for measuring ambient temperature, and the emergency button 141 allowing a local user to immediately shut off (and possible lock) the range 128 and send an alert indicating an emergency situation taking place within their residence 126.

The above-described components of the controller 132 in the second residence 126 are also present in the controller 106 at the first residence 108 although some components may be different such as omitting the gas sensor 144 because the first residence 108 does not have a gas powered cooking appliance.

Figure 3:
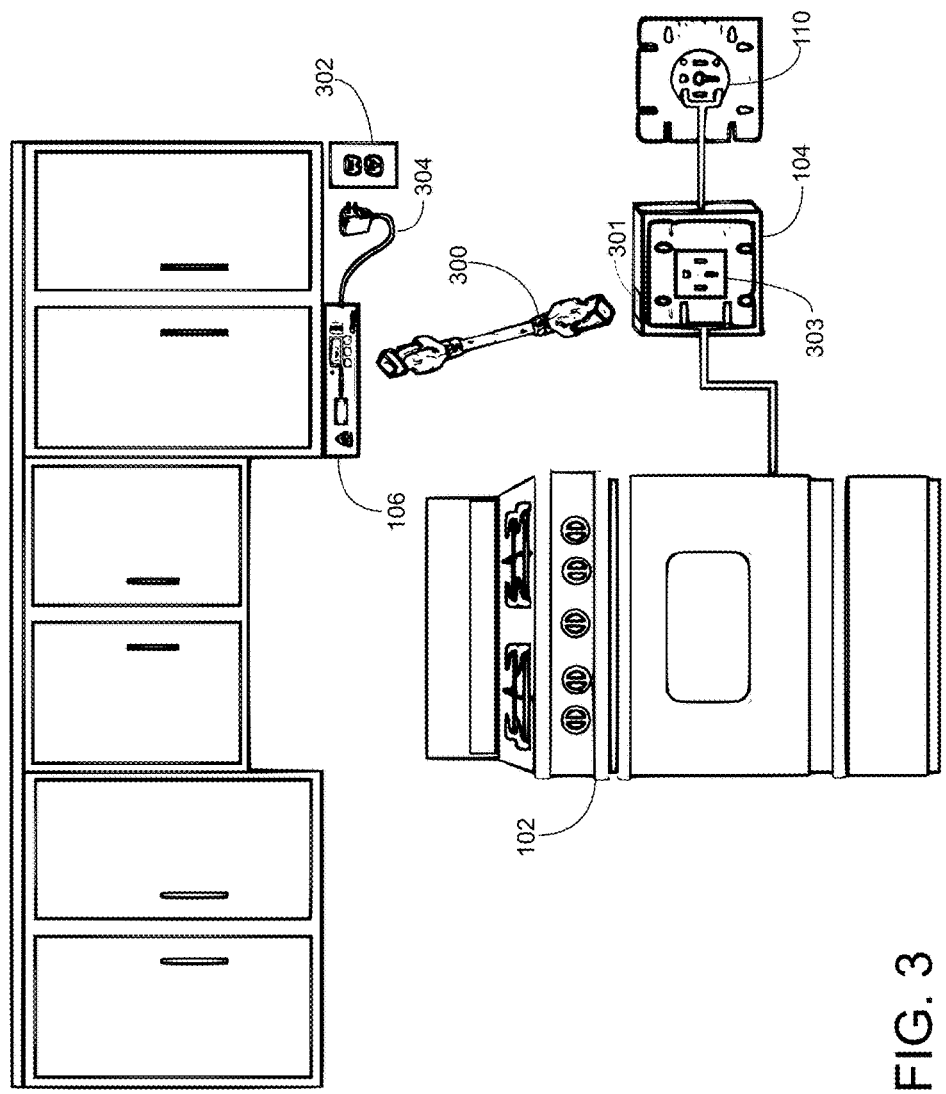
FIG. 3 is a diagram showing installation and hookup of components within the first residence of FIG. 1 where the range is electrically powered.

FIG. 3 is a diagram showing installation and hookup of components within the first residence 108 where the range 102 is electrically powered. As shown, the power switch 104 is plugged in to the electrical socket 110 in the kitchen wall, and the range 102 is in turn plugged in to a socket 303 provided on the power switch 104. The power switch 104 further includes a communications port such as an Ethernet port 301 into which an Ethernet cable 300 is plugged in order to couple the power switch 104 to the controller 106. The cable 300 transfers control signals from the controller 106 and an electrical relay within the power switch 104 selectively opens and closes according to the control signals. When the relay is set to a closed position, power is able to flow from the kitchen's power socket 110 to the heating elements of the electric range 102; alternatively, when the relay is set to an open position, power is unable to flow from the power socket 110 to the heating elements of the electric range 102.

The design of the power switch 104 may be based in part on the design disclosed in U.S. Pat. No. 6,130,413 issued Oct. 10, 2000, which is incorporated herein by reference. Following the techniques described in that patent document, an existing electric clock on the range 102 and other auxiliary electric functions are able to continue operation even when the power switch 104 has cut power to the heating elements according to the control signals received from the controller 106.

The power switch 104 in this embodiment further includes one or more electrical current sensors to determine when a heating element of the range 102 has been turned on by a user. Current sensor signals indicating whether a heating element is drawing power are sent from the power switch 104 to the controller 106 via cable 300.

Although an Ethernet cable 300 is utilized in this embodiment, the cable 300 is simply utilized to provide electrical connectivity between the power switch 104 and the controller 106. The signals transferred do not need to follow the Ethernet standard; any suitable communication protocol and cable type may be utilized in other embodiments, for example, standards such as serial buses (RS-232), general purpose I/O, other protocols using a proprietary communication interface 210, or standard communication interfaces 212, 214, 216, 218. Communication of electrical signals between devices is well known in the art so further description is omitted for brevity.

In this embodiment, the controller 106 is able to communicate signals via cable 300 causing the power switch 104 to open and close its internal relay, and the power switch 104 is able to communicate signals via cable 300 to indicate when power is flowing via power switch 104 due to a heating element of the range 102 being turned on.

In some embodiments, power to open and close the internal relay of the power switch 104 and to power the controller 106 is provided by the power socket 110. Power can be sent from the power switch 104 to the controller 106 via cable 300. In other embodiments, the controller 106 itself includes a power cable and adaptor 304 which is plugged in to another kitchen power outlet 302 as shown in FIG. 3. In such embodiments, power to open and close the relay in the power switch 104 may be provided either by power socket 110 or power socket 302.

Figure 4:
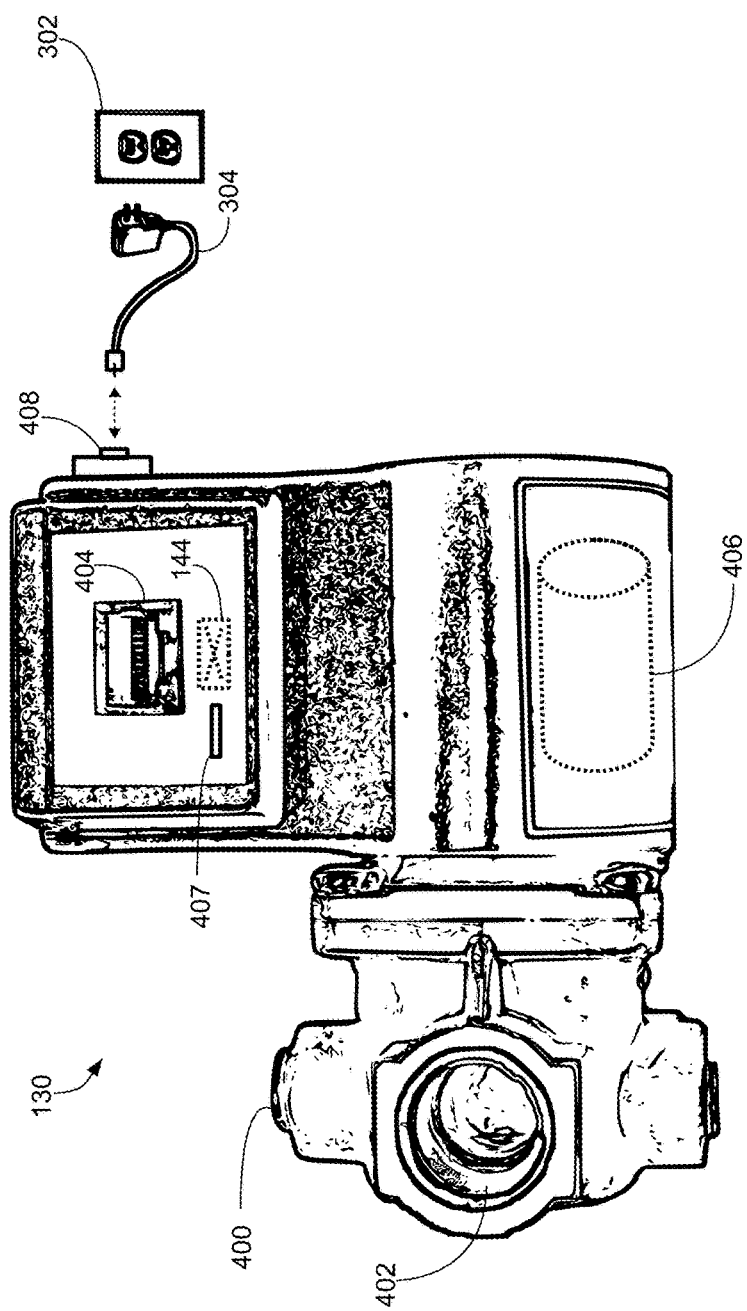
FIG. 4 shows the gas power switch of FIG. 1 utilized to control whether gas can flow from the gas source to the gas powered range in the second residence.

FIG. 4 shows the gas power switch 130 utilized to control whether gas can flow from the gas source 134 to the gas powered range 128 in the second residence 126. The gas power switch 130 includes a gas input port 400 for connection to the gas source 134, a gas output port 402 for connection to the gas powered range 128, and an Ethernet port 404 for receiving electrical power and/or control signals from the controller 132. In response to the control signals, a solenoid 406 actuates in order to selectively allow or disallow gas to flow from the input port 400 to the output port 402.

In some embodiments, the electrical power required by the gas power switch 130 such as to actuate the solenoid 406 is provided by the controller 132 via Ethernet cable 300. Similar to as shown in FIG. 3, a controller 132 coupled to a gas power switch 130 may include its own power cable and adaptor 304 to receive power from a kitchen electrical outlet 302. In other embodiments, the gas powered switch 104 includes a power socket 408 and electrical power to actuate the solenoid of the gas power switch 104 and possibly for the controller 132 is provided by a power cable and adaptor 304 plugged in to a kitchen power outlet 302. In such embodiments, electrical power can be transmitted from the gas powered switch 130 to the controller 132 via Ethernet cable 300 plugged into the Ethernet port 404.

The gas power switch 130 further includes an air vent 407 allowing any leaked gas to be detected by the lower gas sensor 144. When gas is detected by the gas sensor 144, sensor signals are transmitted via Ethernet port 404 and cable 300 back to the controller 132. Other sensors may also be installed in the gas power switch 130 such as gas flow sensors to detect when gas is flowing from the input port 400 to the output port 402.

Both the electric power switch 104 and the gas power switch 130 may include one or more processors (not shown) in order to execute software instructions loaded from a storage device and cause the power switch 104, 130 to perform the functionality described herein.

Figure 5:
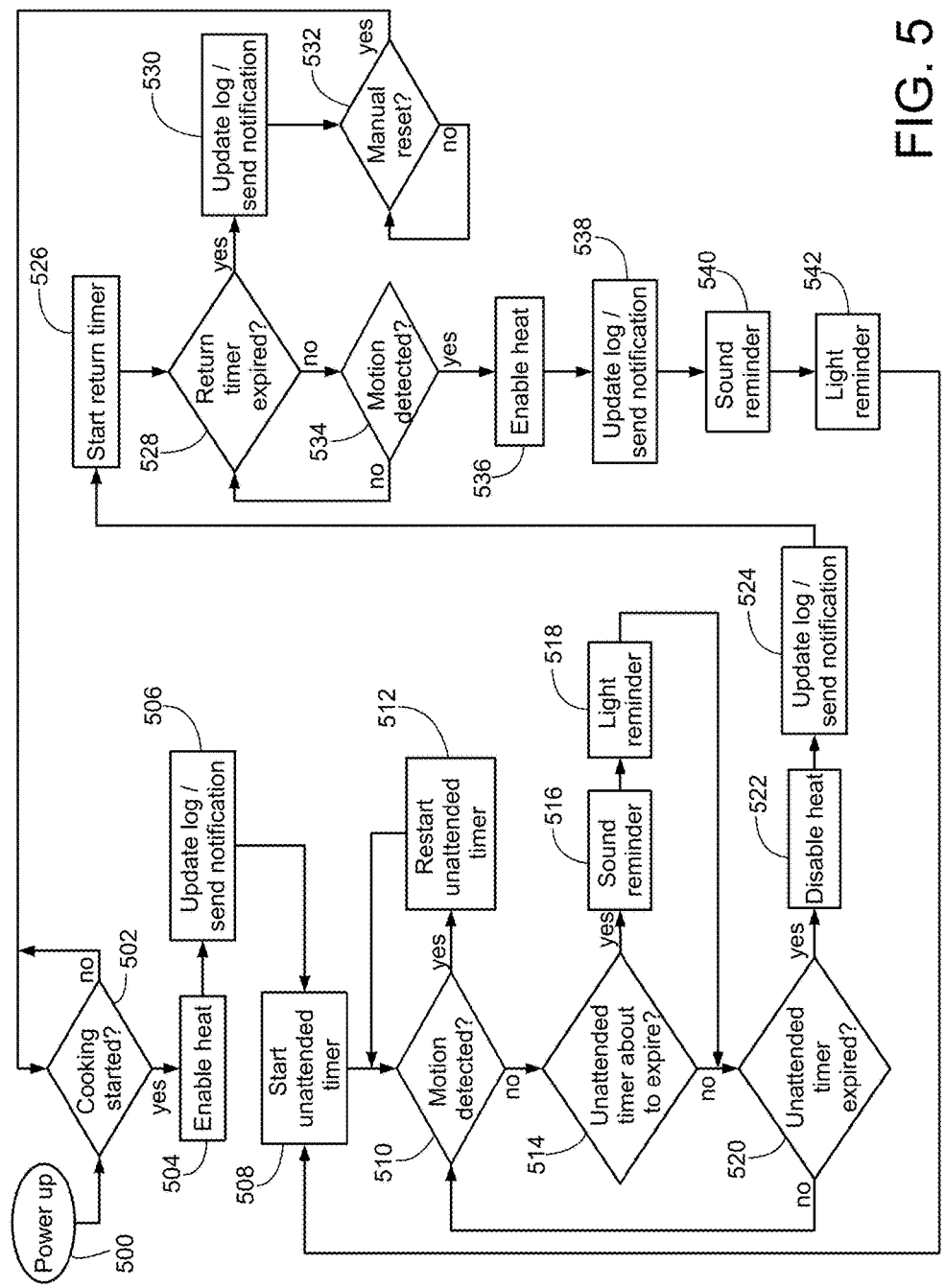
FIG. 5 shows a flowchart of operations performed by each of the controllers of FIG. 1.

FIG. 5 shows a flowchart of operations performed by the controller 106, 132 according to an exemplary embodiment of the invention. The steps of FIG. 5 are not restricted to the exact order shown, and, in other embodiments, shown steps may be omitted or other intermediate steps added. In this embodiment, the processor 200 of the controller 106, 132 executes the software instructions 206 loaded from the storage device 202 in order to cause the controller 106, 132 to perform the illustrated steps.

The process begins at step 500 when the controller 106, 132 is powered up. In a preferred embodiment, the controller 106, 132 stays in a standby mode with very low power draw until a cooking process is started by a user.

At step 502, the processor 200 checks whether a cooking process has been initiated by the user. In some embodiments, a cooking process may be initiated by the user pressing a button 118, 147 on the UI 224 labelled "Start cooking". In other embodiments, the processor 200 may automatically detect that the heating elements of the range 102 have been turned on 128. For instance, the current sensors of the electric power switch 104 may notify the processor 200 that the electric stove 102 has been turned on. Likewise, gas flow sensors installed in the gas power switch 104 may notify the processor 200 that the gas powered stove 128 has been turned on.

At step 504, the processor 200 sends control signals via cable 300 to the power switch 104, 130 causing the power switch to enable the heating elements.

In some embodiments, a child safety setting is enabled by default where a user must first press a "Start cooking" button on the controller 106, 132 before the heating elements are enabled on the range 102, 128. In such embodiments, the power switch 104, 130 is kept in a default state by the controller 106, 132 such that power to heat the heating elements cannot flow to the range 102, 128. For the electric power switch 104, this means the internal relay is kept by default in a first position where electrical power is disconnected, and for the gas power switch 130 this means the solenoid is kept by default in a first position where gas flow is prevented. In response to the user pressing the "Start cooking" button, the processor 200 then enables heat at step 504 by toggling the position of the power switch 104, 130 to enable either electric power or gas power to flow to the range 102, 128.

In other embodiments and situations, the power switch 104, 130 may already be in a position such that electric or gas power can flow to the range at the time step 504 is reached. For example, when the child safety feature is disabled or not in use, the power switch 104, 130 may by default be in a second position where power can flow to the range 102, 128. In this way, a user may turn on the stove or oven in the normal way without needing to take any additional action on the UI 224 of the controller 106, 132. In such a situation, the processor 200 will not actually need to take any specific action at step 504 to enable heat because heat was already enabled when this step 504 is reached.

In general, the processor 200 tracks the state of the power switch 104, 130 and sends control signals to the power switch 104, 130 at step 504 if necessary to enable heating functions on the range 102, 128.

At step 506, the processor 200 updates a log stored in the data 208 of the storage device 202 to record that a cooking process was started along with the current time. The log records all activity detected by the controller 106, 132 and is synchronized automatically with the cloud server 152. The processor 200 also checks the data 208 to determine if a notification should be sent in real-time to the cloud server 152 when a cooking process is started. For instance, a family member or care taker may wish to be notified each time a cooking process is started and may configure the controller 106, 132 to send a notification to one or more destinations each time a cooking process is started. More details on notifications and alerts are provided later in this document.

At step 508, the processor 200 starts an unattended timer. The unattended timer in this embodiment is a countdown timer by default with an initial value of five minutes but can be user configured to any desired value within predetermined minimum and maximum allowed values (e.g., any value between zero and fifteen minutes). The unattended timer represents the maximum amount of time a user can leave the proximity of the range 102, 104 before the controller 106, 132 will automatically disable the heating functions of the range 102, 104.

At step 510, the processor 200 determines whether motion has been detected by at least the primary motion detector 114, 143. The primary motion detector 114, 143 will detect motion of the user in the proximity of the controller 106, 132. In some cases, the primary motion detector 114, 143 will not be able to cover the entire kitchen region and one or more secondary motion detectors 122, 136 may be installed to cover a different part of the kitchen and monitored by the processor 200 at step 510.

At step 512, since motion was detected at step 510, the processor 200 resets the unattended timer back to its initial value (e.g., 5 minutes if the default value is utilized, or any other user-desired value).

At step 514, the processor 200 determines whether the unattended timer is about to expire. For instance, if the timer is within thirty seconds of expiring (or within any other predetermined about-to-expire threshold), control will proceed to step 516; otherwise, if the timer has already expired or is not yet within the expire threshold, control continues to step 520.

At step 516, the processor 200 plays a sound reminder on speaker 222. The sound reminder may be a beep or other audible message reminding the user that they need to return to the kitchen. In some embodiments, a wireless speaker 228 may be installed in another area of the user's residence 108, 126. For example, a speaker 228 may be positioned in a basement or garage.

At step 518, the processor 200 flashes a light reminder on the strobe light 228. Similar to the sound reminder, the purpose of the light reminder is to remind the user to return to the kitchen. In some embodiments, a wireless strobe light 228 may be installed in another area of the user's residence 108, 126. For example, a strobe light 228 may be positioned in a living room over the television.

At step 520, the processor 200 determines whether the unattended timer has already expired. The unattended timer will expire whenever no motion is detected for the entire countdown duration of the unattended timer. If the unattended timer has expired, control proceeds to step 522; otherwise, control returns to step 510.

At step 522, because the unattended timer has now expired, the processor 200 disables the capability of the range 102, 128 to generate heat. This is done by the processor 200 sending control signals via cable 300 to the power switch 104, 130 causing the power switch 104, 130 to cut off either the current flow or the gas flow as appropriate. Disabling heating functions may also include disabling other electrical functions on the cooking appliance 102, 128 or may only involve disabling the capability of the heating elements to generate heat.

At step 524, the processor 200 updates the log to record the fact that the heat was disabled as a result of the unattended timer expiring along with the current time. If notifications are enabled for this event, the processor 200 sends a notification to the cloud server 152.

At step 526, the processor 200 starts a return timer. The return timer in this embodiment is a countdown timer by default with an initial value of fifteen minutes but can be user configured to any desired value within predetermined minimum and maximum allowed values (e.g., any value between zero and thirty minutes). The return timer represents the maximum amount of time a user can return after an automatic shutoff event where the controller 106, 132 will automatically re-enable the heating functions of the range 102, 104. In some embodiments, the processor may play audio and visual reminders on speaker 222/strobe light 228 while the return timer is still running to try and signal the user to return to the kitchen.

At step 528, the processor 200 determines whether the return timer has expired. The return timer will expire whenever no motion is detected for the entire countdown of the return timer. If the return timer expires it means the user both failed to return to the kitchen while the heating elements were activated (e.g., while the unattended timer was running, steps 508-520) and further failed to return to the kitchen within a reasonable time after the heating elements were automatically disabled (e.g., while the return timer was running, steps 526-528). When the return timer has expired, this likely means the user really did forget they were cooking or some other emergency event has occurred and control therefore proceeds to step 530 to lock the stove; otherwise, control continues to step 534 to give the user more time to return.

At step 530, because the return timer has expired, the processor 200 updates the log to record this fact along with the current time. If notifications are enabled for this event, the processor 200 sends a notification to the cloud server 152.

At step 532, the processor requires a manual reset procedure to be completed before the range 102, 128 can be used to cook again. While at step 532, the user is locked out from using the cooking functions of the range 102, 128 until the reset procedure is performed. The reset procedure may involve the user simply pressing a "Reset" or other button on the UI 224 of the controller 106, 132. Pressing a button on the controller 106, 132 means the user has returned to the kitchen and is trying to interact with the range 102, 128. A passkey or other predetermined sequence of keys may be required to ensure the user realizes they are performing a reset. In another embodiment, the manual reset procedure may involve a remote user reactivating the stove functionality such as via one of the remote user devices 148 communicating with the cloud server 146, which can then send a reset signal down to the controller 106, 132 via the Internet 150 in order to satisfy the manual reset requirement of step 532. Combinations of local and remote resets may also be required. For instance, a family member may need to perform a reset on a remote user device 148 in addition to the user being required to perform a manual reset on the UI 224 of the controller 106, 132. When the reset procedure has been successfully completed, control returns to step 502 to allow another cooking process to be started.

At step 534, the processor 200 determines whether motion has been detected by at least the primary motion detector 114, 143. The primary motion detector 114, 143 will detect motion of the user in the proximity of the controller 106, 132. In some cases, the primary motion detector 114, 143 will not be able to cover the entire kitchen region and one or more secondary motion detectors 122, 136 may be installed and monitored by the processor 200 at step 534.

At step 536, because the user has returned to the kitchen before the return timer has expired, the controller 106 automatically re-enables the heating function of the range 102, 128. This is done by the processor 200 sending control signals via cable 300 to the power switch 104, 130 causing the power switch to enable the heating elements.

At step 538, the processor 200 updates the log to record that the user returned during the return timer along with the current time. If notifications are enabled for this event, the processor 200 sends a notification to the cloud server 152.

At step 540, the processor 200 plays a sound on speaker 222 to remind the user that the heat has been automatically re-enabled.

At step 542, the processor 200 flashes a light on strobe 228 to remind the user that the heat has been automatically re-enabled. The UI 224 also displays a message on the screen indicating the action that is currently taking place such as "Turning stove on". Control then returns to step 508 to start the unattended timer and continue the process from that point in the flowchart as already described.

FIG. 6 shows a flowchart of operations performed by the cloud server 152 according to an exemplary embodiment of the invention. The steps of FIG. 6 are not restricted to the exact order shown, and, in other embodiments, shown steps may be omitted or other intermediate steps added. In this embodiment, one or more processors of the cloud server 152 execute software instructions loaded from a storage device with the computer server 152 in order to cause the server 152 to perform the illustrated steps.

The process begins at step 600 when the cloud server 152 is powered up.

At step 602, the server 152 determines whether a new stove notification from a controller 106, 132 has been received. Stove notifications correspond to the notifications sent at any of steps 506, 524, 530, 538 of FIG. 5. Other notifications may be sent by the controller 106, 132 to the cloud server. For instance, a notification may be sent when the emergency button 112, 141 on the controller 106, 132 is pressed, gas sensors 142, 144 detect gas leaks, temperature sensor 139 detects an extreme temperature, water sensor detects a flood, smoke detector detects smoke, carbon monoxide detector detects carbon monoxide, etc. Additionally, notifications received from stoves may also include log synchronization messages and general heartbeat messages to ensure that communications from the controller 106, 132 to the server 152 are still working.

At step 604, the server 152 updates a central log stored at the cloud server 152 according to the new stove notification. The central log stores events and times of the events as reported by the controller 106, 132 along with their associated controller identifier. In this way, the cloud server 152 can track and control a plurality of controllers 106, 132 perhaps owned and/or operated by different users in different residences 108, 126. The server 152 maintains privacy between the log data and control functions between different users' data stored on the cloud server 152.

At step 606, the server 152 determines whether one or more alerts messages should be sent according to the new stove notification. Each user and/or care provider associated with a user may set up email or short message service (SMS) alerts for any particular event. Other types of alerts may be utilized in other embodiments; for example, a software application running on user devices 148 may receive push notifications from the cloud server 152.

At step 608, the server 152 sends the one or more alerts required in response to the new stove notification. For instance, when the server 152 receives a notification from the controller 106 in the first residence 108 indicating that a user has pressed the emergency button 112, the server 152 may immediately send an SMS and email alert to a phone number and email address pre-configured at the server 152 for the user associated with the controller 106 from which the notification was received.

At step 610, the server 152 determines whether one of more controller 106, 132 have failed to provide a recent notification message.

At step 612, the server 152 attempts to poll the controller 106, 132 from which recent notifications are lacking to ensure communications with that controller 106, 132 are still possible.

At step 614, the server 152 determines whether communications were successfully established with the controller 106, 132 from which recent notifications are lacking.

At step 616, when the server 152 is unable to reach the missing controller 106, 132, the server 152 updates the cloud log to record this fact along with the current time.

At step 618, the server 152 sends one or more alerts to designated individuals to inform them of the communication problem.

At step 620, the server 152 determines whether cloud settings for a particular have changed. Cloud settings may include preprogrammed time-based and on-demand lockouts when a particular user should not be cooking, specific timer values for the unattended timer and return timer, default child lock settings etc.

At step 622, the server 152 updates the cloud log to record the changes along with the current time and a user identifier specifying who made the change.

At step 624, the server 152 pushes the changed settings to the controller 106, 132 associated with the changed settings. For instance, if the change pertains to the user in the first residence 108, the server 152 sends the changed settings down to the controller 106 in the first residence 108.

At step 626, the server 152 determines whether the settings were successfully pushed to the controller 106, 132.

At step 628, the server 152 updates the cloud log to record the fact that the changes were not successfully pushed to the controller 106, 132.

At step 630, the server 152 sends one or more alerts to designated individuals to inform them of the communication problem.

At step 632, the server 152 determines whether it has received an alert acknowledgement message from one of the user devices 124, 140, 148. Alert acknowledgement messages may be required to ensure that the designated person has actually received the alert. For instance, if the server 152 sends an alert to a mobile phone 156 indicating that the emergency button 112 has been pressed in the first residence 108, the server 152 may expect to receive back a message from mobile phone 156 indicating that the alert has been acknowledged. This may be done by the user of mobile phone 156 replying to the alert, either email or SMS with a message such as "ACK". Other desired acknowledgement mechanisms can be utilized such as pressing a particular onscreen button displayed in a custom application running on the remote user device 1148. If no alert acknowledgement is received within a predetermined time duration after the alert was sent, the server 152 may automatically send a failsafe alert to another recipient such as a facility manager or emergency services.

At step 634, the server 152 updates the cloud log to record the fact that the alert was acknowledged along with the current time and a user identifier representing the user who acknowledged the alert.

At step 636, the server 152 determines whether the controller 106, 132 to which the alert pertains should be informed of the acknowledgement. For instance, after the emergency button 112 has been pressed, the controller 106 may display a message such as "Alert sent" on the UI 224. Then, after the alert has been acknowledged by a caretaker or family member, the controller 106 will receive a message from the cloud server 152 informing of the acknowledgement. In response, the controller 106 displays a message such as "Alert acknowledged" on the UI 224. This way, the user in the kitchen knows that help is on the way. In some embodiments, if certain alerts are not acknowledged after a predetermined time period, the controller 106, 132 may resend a notification to the server 152 or may revert to directly sending alerts directly to the same or different designated individuals. When the controller 106, 132 should be informed of the acknowledgement, control proceeds to step 624 to push the acknowledgement to the controller 106, 132; alternatively, when there is no need to inform the controller 106, 132, control returns to step 602 to restart the loop checking for events at the server.

In an exemplary embodiment, a stove controller starts an unattended timer when a cooking process is started. The controller monitors whether motion is detected in the kitchen prior to the unattended timer expiring and resets the unattended timer each time motion is detected. If the unattended timer expires without any motion being detected, the controller disables the heating elements of the stove and starts a return timer. The controller monitors whether motion is detected in the kitchen prior to the return timer expiring. When motion is detected, the controller automatically re-enables the heating elements of the stove so that cooking can continue. If motion is not detected and the return timer expires, the controller locks the stove until a reset procedure is performed. Alerts of the stove activity are sent to external devices over the Internet, and the reset procedure may be performed on the controller or on one of the external devices.

In other embodiments one or both of the unattended timer and/or return timer can be unused or deactivated by setting its initial value to zero (or a low value such as five to ten seconds). For instance, if the unattended timer is started with a value of zero, then the user's presence is always required to be detected in the kitchen at step 510 or the timer will immediately expire at step 520. In this way, the user is not permitted to leave the kitchen during cooking or the stove will immediately shut off. Likewise, if the return timer is started with a value of zero, then the heating will never be automatically re-enabled after it was automatically disabled at step 522. In this way, once a user leaves long enough to cause the controller 106, 132 to disable heat at step 522, the manual reset procedure at step 523 will need to be performed before the stove can be used for cooking again. Either, both, or neither of the unattended timer and/or return timer can be set with an initial value of zero and as previously mentioned the initial value can be a user configurable setting so may differ at different times and/or for different users.

Rather than detecting motion at steps 510 and/or step 524 to detect the user's presence in the kitchen, other activity or sensor signals can be detected instead. For instance, proximity of a user's mobile phone 124, 140 or other electronic device may be utilized instead of motion. This may be beneficial if the user is in a care facility and wears an RFID bracelet or other identifier. The motion sensor 114, 143 in the controller 106, 132 may be replaced with an RFID sensor and steps 510, 524 are modified such that the processor 200 checks whether the RFID bracelet is detected by the RFID sensor in the kitchen. In yet another example, there may be an "I'm here" button 118, 147 on the faceplate of the controller 106, 132 that the user must physically push. Pushing of the button ensures the user has returned to the kitchen and takes the place of detecting motion. Likewise, rather than a physical button on the controller 106, 132, a virtual "I'm here" button may be provided on an app running on the user's mobile phone 124, 140 or other device within the residence 108, 126. The app may only allow the user to push the button when in close proximity to the controller 106, 132 (i.e., the user is within the kitchen). Heat sensors, infrared sensors, floor pressure sensors, laser/light emitting diode (LED) beam break sensors, or other sensors may be utilized to detect a user's presence in the kitchen in other embodiments.

In general, all the UI functions can be local to the controller 108, 126 such as physical buttons 118, 147 and screen 116, 145 on the controllers 106, 132, and/or may also be remotely displayed and even controlled on one or more user devices such as mobile phones 124, 140, 156 and computers 154. User authentication such as login procedures may be employed in known manners to ensure that user security is ensured.

The unattended timer and/or return timer functionality may be temporarily disabled for cooking certain meals such as roasts where the cook times are known in advance to exceed these timer settings. The override may be performed by entering a code or other combination of menu options on the UI 224 on the controller 106, 132. Alternatively, the override functionality may be activated via a user logging in to the system 100 via either on onsite user device 124 and/or a remote user device 148. Family members or caregivers may need to confirm or otherwise give permission via the cloud server 152 in order to allow the user within the kitchen to disable the unattended/return timer(s).

The emergency button 112, 141 may be configured to shut off the cooking appliance 102, 128 by sending control signals to the power switch 104, 130 immediately causing the power switch 104, 130 to prevent power (either gas or electric) from flowing to the heating element(s) of the cooking appliance 102, 128. The emergency button 112, 141 may also be configured to send alerts to the server 152 or one or more user devices 124, 126, 154, 156 via the Internet 150. Even if the range 102, 128 is not currently in use at the time the emergency button 112, 141 is pressed, the controller 106, 141 will preferable still send any configured alerts to the predetermined destinations. In this way, the emergency button can alert family members or caregivers to noncooking related emergencies occurring within the residence 108, 126. For example, the user may be feeling faint and press the emergency to summon assistance.

For the various connected devices of system 100 including the controllers 116, 132 and various user devices 124, 140, 154, 156, any desired connection mechanism to the Internet 150 may be employed in different embodiments. Examples include Wi-Fi and access points 120, 138 as shown in FIG. 1, but also such as long-term evolution (LTE) provided by a cell base station 158 and other high-speed data options both wired and wireless. For example, the controller 106, 132 may communicate with the cloud servers 146 via cell tower 158 and thereby prevent the need to install an access point 120, 138 within the user's residence.

Other types of notifications messages and log data may be sent from the controller 106, 132 to the cloud server 152 informing the server 152 of any desired events detected within the residence 102. For instance, the lower gas sensor 144 may detect heavy gases such as propane indicating a gas leak or other problem with gas installation of the gas power switch 130 to the gas source 134. In response to gas sensor signals indicating the presence of gas, the controller 132 may be operable to automatically lock out the cooking functions of the gas range 128 and immediately send one or more notification messages to the cloud server 152 or other user devices 124, 140, 154, 156 to summon assistance. Likewise, if the upper gas sensor 142 detects lighter gases from the burners, a similar process may occur to shut off the stove heating functions and send notification via the Internet 150. In both gases, if the gas dissipates and is no longer detected by the gas sensor 142, 144, the controller 132 may automatically reset the lock on the power switch 104, 130 so that the gas range 128 may utilized for cooking again. Visual messages may be presented on the screen 145 so that the user knows that gas was present. In other embodiments, upon the gas dissipating, the stove may display the message informing the user but also enter state 532 of the flowchart of FIG. 5 so that the user must manually perform a manual reset procedure before another cooking process can be started. In yet other embodiments, whether a manual reset is required may depend on which of the upper or lower gas sensors 142, 144 detected the gas. Lower gas may be deemed more serious such as a pipe leak and therefore require a manual reset or other special code by a technician after repair is completed while upper gas may be deemed less serious and be automatically reset by the controller 132 a predetermined duration after the gas is no longer detected by the upper gas sensor 142.

The upper and lower gas sensors 142, 144 may be calibrated by to a normal base value by utilizing a menu function of the UI 224 on the controller 132. The calibration procedure is performed when no gas leak is present such as immediately after installation when confirmed by a technician. The baseline sensor values measured when no leak is present are recorded by the controller 132 and stored in the storage device 202. During normal operation thereafter, if the controller 132 detects gas sensor values that significantly differ from the baseline values (e.g., exceed one or more of the baseline values by a predetermined amount) then the controller 132 will deactivate the heating functions on the gas powered cooking appliance 128 and send out the notifications as preconfigured depending on the user settings.

In yet other embodiments, the cloud server 152 is not utilized and the controllers 106, 132 operate in a standalone mode without cloud support. For instance, the process described in FIG. 5 may still be performed by an individual controller except for the steps related to sending alerts to the cloud server 152. For standalone controllers 106, 132, the one or more of the communication interfaces 204 may be omitted to thereby lower the cost of the unit. Alternatively, the communication interfaces 204 may still be included but just not utilized thereby allowing the user to "upgrade" their controller to an Internet connected controller 106, 132 at a future time. As such, during standalone operation the notification steps of FIG. 5 may be omitted such that the controller 106, 132 does not send any notifications or alerts; alternatively, these steps may be modified such that the controller 106, 132 itself directly sends email and/or SMS (or other) alerts to intended destinations. Having the cloud server 152 be primary recipient of notification sent by the controller 106, 132 is beneficial to allow other family members and caretakers to monitor the situation within the residence; however, similar goals can be achieved with or without a cloud server 152 in other embodiments. For instance, remote user devices 148 may directly communicate over the Internet 150 with controllers 106, 132 in particular residences 108, 126 to both receive notification messages and/or or poll or read the usage log from stored in the data 208 of the storage device 202.

Other user-specific settings may also be stored in the data 208 of the storage device 202 of each controller 106, 132. For instance, one or more time-based lockout settings may be configured for a particular controller 106, 132. A time-based lockout setting specifies a disable time range during which cooking is not permitted. The controller 106, 132 monitors the current time using clock chip 220 and will not allow any new cooking processes to start during the disable time range. For example, cooking may be prevented during late night hours from midnight to 5 am. Alternatively, one or more time-based allow settings may be configured for a particular controller 106, 132. A time-based allow setting specifies an allowed time range during which cooking is permitted. The controller 106, 132 monitors the current time using clock chip 220 and will only allow new cooking processes to start during the allowed time range. For example, cooking me be allowed only during a four-hour window from 10 am to 2 pm. Any combination of time-based settings may be dynamically configured for a particular user's controller 106, 132, and different time-based settings may apply on different days or specific dates or for different users.

Other types of lockout and allow settings other than time-based settings may be utilized. For example, on-demand settings (either lock or allow) may be initiated at any time and stay in effect until canceled or any other predetermined end duration. This may be beneficial if cooking is only permitted by a particular user when a care taker is present in the user's residence 108, 126. The controller 106, 132 is configured by default to disable cooking function on the range 102, 128. When the caretaker arrives, the caretaker manually activates the on-demand allow function, or the controller 106, 132 automatically detects the presence of the caretaker such by proximity of the caretaker's mobile phone 124, 140 and activates the on-demand allow function. Likewise, when the caretaker leaves the residence 108, 126, either the caretaker manually disables the on-demand allow function or the controller 106, 132 automatically cancels it. The on-demand settings (either lock and/or allow) may have a built-in expiry time duration such that, if they are not manually canceled within a predetermined or user-specified X minutes, the controller 106, 132 will automatically cancel the on-demand setting. In another example, a remote user may be able to shut off the heat and lock the cooking appliance at any time by activating a remote shut-off via any authorized remote user device 148.

On-demand settings may also be activated and deactivated using unlabeled or otherwise obfuscated UI buttons 118, 147. For example, the controller 106, 132 may be configured such that an on-demand lock out setting is activated when the "Menu" button is held down for five seconds. Unlock may be performed in a similar manner by holding down the same button for five seconds. In this way, if a care taker wants to step out of the residence for a moment they may easily deactivate the cooking appliance 106, 132 and then re-enable it when they come back. Such on-demand settings may take preference over time-based settings such that the cooking appliance 102, 128 could be locked or allowed even while the current time is within a time frame with the opposite setting. All combinations and permutations of these user-specific settings may be permitted and be dynamically set by users, caretakers, and/or family members as desired.

Other methods to activate and deactivate on-demand settings include entering personal identification identifiers (PINs) on the controller UI 224, using pre-authorized apps on mobile phones or other user devices 124, 140, 154, 156 that are associated with the controller 106, 132, toggling settings via cloud server 146, physical keys inserted into the controller 106, 132, Bluetooth pairing to specific mobile devices 124, 140 in proximity causing automated activating and deactivation, passwords, etc. A reset pin may be included in the back of the controller into which a pen, paperclip, or other device can be inserted and held for five seconds to reset the unit back to its default state. This may be beneficial if a caretaker sets a particular password required to enable heating functions and is later discharged by family members. The family members can reset the unit to clear out the unknown password.

Another user-specific setting that may be preprogrammed by users is the default cook timer setting. Similar to how the unattended timer setting is automatically started at step 508, each time a cooking operating is initiated, the default cook timer may also be started by the controller 106, 132 at step 508. Unlike the unattended timer setting, the default cook timer is not automatically reset at any time during the cooking process and does not depend upon motion or other external inputs. Instead, the controller 106, 132 simply automatically disables the heating functionally of the cooking appliance when the default cook timer setting expires. In this way, the default cook timer acts as a failsafe mechanism suitable for a forgetful person who may still be in the kitchen. For example, a particular user may always cook a meal that requires fifteen minutes of bake time. The user may simply press the start cook button and the default cook timer will ensure that the oven shuts off after fifteen minutes even if the user never leaves the kitchen. The default cook timer is similar to a regular oven's bake timer, except the timer value has a preset, user-programmed default setting and is automatically activated by the controller 106, 132 for all cooking processes.

In other embodiments, the user may need to press a "Timed bake" or similar button to activate the default cook timer rather than the controller 106, 132 automatically activating it for all cooking. This is similar to a regular oven's bake timer, except the timer has a preprogrammed default time value. This may be beneficial for an elderly person who finds it difficult to repeatedly press multiple buttons in order to setup a same bake time of fifteen minutes every time they cook their lunch, for example.

The various user-specific settings for a particular controller 106, 132 may be added or changed at any time utilizing the onscreen UI 224, via an application or web interface running on a user device 124, 140 connected with the controller 106, 132, or by an application or web interface running on a remote user device 148 connected with the cloud server 152. When cloud based settings are applied, a user may first make a settings change on the cloud server 152 and then the server 152 pushes the new settings down to the appropriate controller 106, 132 (e.g., see step 624) of FIG. 6. This may happen in real time or at designated intervals such as every thirty minutes. Alternatively, a controller 106, 132 may poll the server 152 at specific intervals such as every thirty minutes to check for new settings.

Each controller 106, 132 may have a sticker attached during manufacture that specifies the media access control (MAC) address of the controller 106, 132 along with a security code such as a random five-digit number. The list of MAC addresses and corresponding security codes assigned during manufacture are stored on the cloud server 152 and utilized by the cloud server 152 as a verification tool. When adding a controller 106, 132 to the user's cloud account on cloud server 146, the user is required to input both the MAC address along with the security code printed on the label affixed to the controller 106, 132. The cloud server 152 then verifies that the security code entered by the user matches the security code associated with the MAC address at the time of manufacture. If there is a match then this means the user is in physical possession of or proximity to that particular controller 106, 132. The server 152 therefore presumes the user to be a valid user of the particular controller 106, 132. Other security checks may also be performed such as verifying the name, phone number, or other details of the purchaser of the specific controller 106, 132 stored on the cloud server 152 in a similar manner. Performing one or more security checks before allowing a user to add a controller 106, 132 to their cloud account helps ensure user security by making it difficult to add an incorrect controller 106, 132 to a particular user's cloud account.

The cloud accounts on the cloud server 152 may allow a single user to add multiple controllers 106, 132 and then either track the user log and/or control the user-specific settings for those controllers 106, 132. Adding multiple controllers 106, 132 to a single user's cloud account may be beneficial for a care provider responsible for the monitoring a plurality of users, each with their own kitchen. Likewise, a single controller 106, 132 may be added to multiple cloud accounts. This may be beneficial when several family members all want to monitor and possibly change controller log data 208 and settings for the controller 106, 132 in the residence 108, 126 of a particular elder relative, for example. Different user permissions may be established at the cloud server 152 where some users can only monitor log data and receive alerts but cannot make any changes such as setting up new time zones are configuring alert destinations. Other users may be able to make these changes. User permissions may be beneficial when care of a particular person is handled by a care provider but family members of that particular person still want to monitor log data 208 and receive alerts. The care provider may have admin privileges on the cloud server 152 for the controller 106, 132 installed in the particular person's residence 108, 126 while the family members may only have viewer privileges for that same controller 106, 132.

User reporting and administrative schedules may be set up in the cloud server 152 such that a first user device 124, 140, 148 receives alerts for a particular controller 106, 132 during a first time period or other date/time range, and a second, different user device 124, 140, 148 receives alerts for the particular controller 106, 132 during a second, different time period or date/time range. This may be beneficial to cause nightshift staff of a care facility to receive alerts during the night while dayshift staff receive the alerts during the day. The recipient phone number and/or email address for each time of alerts and timeframe (if desired) may be different for different types of alerts.

For safety, if someone tampers with the network cable 300, the power switch 104, 130 is operable to immediately return to the lock position such that power (either gas or electric) cannot flow to the heating elements of the cooking appliance. In this way, cooking is not possible if the controller 106, 132 is not properly connected and in communication with the power switch 104, 130. An alert may be sent from the controller 106, 132 to the cloud server 152 or one or more user devices 124, 140, 148 in this situation.

The motion sensors 114, 122, 143, 136 may also be monitored by the controller 106, 132 outside of cooking processes in order to detect motion with the residence 108, 126 as an additional safety feature. Records of detected motion may be stored in the log data 208 and viewed by family members. Notifications may be sent by the controller 106, 132 to the cloud server 152 (or other user devices 124, 140, 148) in the event no motion is detected for a predetermined period such as twelve hours. This may be beneficial to ensure the safety by notifying family members or a caretaker if a particular user has not been up and about within their residence 108, 126 for over twelve hours. The specific time duration and whether this feature is activated can be user configurable settings. When utilized for this purpose, the secondary motion sensors 122, 136 can be placed in other high traffic areas around the residence 108, 126. The UI 224 and/or cloud server 152 user interface allows specifying which of the secondary motion sensors 122, 136 are outside of the kitchen so that they are not utilized to reset or stop the unattended timer or return timer at steps 510 and 534 of FIG. 5.

In another example, the controller 106, 132 may monitor at least the primary motion sensor 144, 143 and turn on the backlight 226 whenever motion is detected. In this way, the backlight 226 may operate as an automated night light providing ambient light at night when someone enters the kitchen.

In yet another example, the controller 106, 132 continuously monitors the temperature sensor 139 in order to detect ambient temperatures outside a normal range. In the event of an unsafe cooking process, the ambient temperature measured by the temperature sensor 139 will exceed a predetermined high threshold. In response, the controller may disable heat on the cooking appliance and send a notification to the cloud server 152 and/or one or more user devices 124, 140, 148. Alternately, in the event of a furnace failure within the user's residence during winter months, the ambient temperature measured by the temperature sensor 139 will exceed a predetermined low threshold. In response, the controller will send a notification to the cloud server 152 and/or one or more user devices 124, 140, 148. Other sensors may also be included within the controller 106, 132 and monitored in a similar manner. For instance, the processor 200 of the controller 106, 132 may be coupled to one or more of an infrared heat detector, a carbon monoxide detector, a smoke detector, an ultraviolet flame detector, a water detector, etc. In the event of abnormal readings detected by any of the sensors, the controller 106, 132 is operable to perform a preconfigured operation such as shutting of the heat and/or sending one or more notifications/alerts to the cloud server 152 or another remote device 124, 140, 148.

The UI 224 may include a QWERTY keyboard, touch screen, and/or numerical screen. Likewise, the menu system may provide quick access to common functions related to cooking such as metric to imperial units conversion and recipes.

Although the invention has been described in connection with preferred embodiments, it should be understood that various modifications, additions and alterations may be made to the invention by one skilled in the art without departing from the spirit and scope of the invention. For example, although the above description has focused on stoves and residential applications for illustration purposes, the present invention is equally applicable to any appliance generating heat in both domestic and commercial applications. Examples include factory burners, soldering irons, kettles, irons, etc. Similar techniques can also be utilized with other devices that are not directly for generating heat but that may get hot over time if forgotten such as motors, garbage compactors, televisions, etc.

Rather than having a separate controller 106, 132 and power switch 104, 130 located in separate boxes that are installed in the kitchen, these devices 106, 132, 104, 130 may be integrated with the cooking appliance itself. For instance, an electric range 102 may include an integrated controller 106 and power switch 104. Likewise, a gas range 128 may include an integrated controller 132 and gas power switch 130.

In other configurations, above-described units may be multiplied. For instance, a single controller 106, 132 may be coupled to and control a plurality of power switches 104, 130. Taking the first residence 108 as an example, the controller 106 may be coupled to a first power switch 104 for enabling and disabling the heat on the range 102 as shown in FIG. 1, and the controller 106 may also be coupled to one or more additional power switches (not shown) enabling and disabling the heat on one or more additional cooking appliances such as toasters, toaster ovens, and microwaves within the kitchen. Each of the power switches 104 may be coupled to the controller 106 using any available communication interface 204 including both wired and wireless. The X10 protocol utilizing power line wiring for signaling and control may also be utilized to couple one or more of the power switches to the controller 106. When the controller 106 enables heat at steps 504/536 and/or disables heat at steps 522 of FIG. 5, all of the power switches 104 for each of the various cooking appliances in the kitchen receive the control signals from the controller 106. In this way, multiple cooking appliances can be turned on and off in tandem all controlled by a single controller 106, 132. Some of the power switches coupled to a particular controller 106, 132 may be electrical power switches 104 and some may be gas power switches 130.

Above-described functionality such as the flowcharts and operational description may be achieved by one or more processors 200 operating pursuant to instructions stored on a tangible, non-transitory computer-readable medium such as a storage device 202 to perform the above-described functions. Examples of the computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network such as the Internet 150. The processors 200 may be included in a general-purpose or specific-purpose computer that becomes the controller 106, 132 or any of the above-described devices such as cloud servers 146, user devices 124, 140, 148, and power switches 104, 130 as a result of executing the instructions.

In other embodiments, rather than being software modules executed by one or more processors, the devices may be implemented as hardware circuits configured to perform the above-described functions. Examples of hardware circuits include combinations of logic gates, integrated circuits, field programmable gate arrays, and application specific integrated circuits (ASICs), and other analog and digital circuit designs.

Functions of single devices may be separated into multiple units, or the functions of multiple devices may be combined into a single unit. Unless otherwise specified, features described may be implemented in hardware or software according to different design requirements. In addition to a dedicated physical computing device, the word "server" may also mean a service daemon on a single computer, virtual computer, or shared physical computer or computers, for example.

All combinations and permutations of the above described features and embodiments may be utilized in conjunction with the invention.

What is claimed is:

1. A system for notifying remote users of lack of user presence around an appliance that is generating heat, the system comprising:
   a switch selectively limiting flow of a power source to the appliance according to a control signal;
   a controller coupled to the switch and generating the control signal;
   a sensor coupled to the controller and detecting presence of a user in a proximity of the appliance; and
   a network interface of the controller coupled to a computer network;
   wherein the controller starts an unattended timer after heat generation is started by the appliance;
   the controller restarts the unattended timer each time the sensor detects the user is within the proximity of the appliance while heat generation by the appliance is enabled;
   in response to the unattended timer reaching a predetermined expiry duration while heat generation by the appliance is enabled, the controller controls the control signal to disable heat generation by the appliance and sends one or more alert notifications via the computer network;
   wherein the controller starts a return timer after heat generation is disabled by the appliance;
   in response to the sensor detecting the user is within the proximity of the appliance prior to return timer reaching a predetermined expiry duration, the controller controls the control signal to re-enable heat generation by the appliance and send one or more alert notifications via the computer network; and
   in response to the sensor not detecting the user is within the proximity of the appliance prior to return timer reaching a predetermined expiry duration, controls the control signal to reenable heat generation by the appliance only in response to receiving a reset signal via the computer network.

2. The system of claim 1, wherein the predetermined expiry duration is dynamically changeable according to one or more configuration messages received by the controller via the computer network.

3. The system of claim 1, further comprising:
   a server coupled to the controller via the computer network;
   wherein the controller sends the one or more alert notifications to the server; and
   in response to receiving the one or more alert notifications from the controller, the server determines a user device associated with the controller and sends one or more alert messages to the user device.

4. The system of claim 3, wherein:
   in response to the server receiving the one or more alert notifications from the controller, the server selects the user device from a plurality of user devices associated with the controller according to a current date/time when the alert notification is received; and
   the user device selected is a particular one of the user devices designated to receive alerts associated with the controller during a date/time range that includes the current data/time when the alert notification is received.

5. The system of claim 1, wherein:
   the power switch includes a flow sensor that generates a start signal in response to the flow sensor detecting heat generation started by the appliance; and
   the controller starts the unattended timer in response to receiving the start signal from the flow sensor.

6. The system of claim 1, wherein the sensor IS a wireless receiver detecting a wireless signal transmitted by a user device within the proximity of the appliance.

7. The system of claim 1, further comprising:
   a clock chip coupled to the controller;
   wherein the controller further controls the switch to only allow heat generation by the appliance during one or more predetermined date/time ranges; and
   the one or more predetermined date/time ranges are set according to one or more messages received via the computer network.

8. The system of claim 1, wherein:
   in response to an event occurrence, the controller controls the control signal to disable heat generation by the appliance;
   the controller sends one or more event notifications corresponding to the event occurrence via the computer network; and
   after disabling heat generation in response to the event occurrence, the controller only controls the control signal to reenable heat generation by the appliance in response to receiving a reset signal via the computer network.

9. The system of claim 1, further comprising:
   a reminder device coupled to the controller but located outside the proximity of the appliance detected by the sensor;
   wherein, upon the unattended timer being within an about-to-expire threshold of the predetermined expiry duration, the controller controls the reminder device to remind the user to return to the proximity of the appliance.

10. The system of claim 9, wherein the reminder device includes at least one of a speaker and a light utilized to remind the user to return to the proximity of the appliance.

11. A method of notifying remote users of lack of user presence around an appliance that is generating heat, the method comprising:

selectively limiting flow of a power source to the appliance according to a control signal;

starting an unattended timer after heat generation is started by the appliance;

detecting presence of a user in a proximity of the appliance;

restarting the unattended timer each time the user is detected within the proximity of the appliance while heat generation by the appliance is enabled;

in response to the unattended timer reaching a predetermined expiry duration while heat generation by the appliance is enabled, controlling the control signal to disable heat generation by the appliance and sending one or more alert notifications via a computer network;

starting a return timer after heat generation is disabled by the appliance;

in response to detecting the user is within the proximity of the appliance prior to return timer reaching a predetermined expiry duration, controlling the control signal to re-enable heat generation by the appliance and send one or more alert notifications via the computer network; and in response to not detecting the user is within the proximity of the appliance prior to return timer reaching a predetermined expiry duration, controlling the control signal to reenable heat generation by the appliance only in response to receiving a reset signal via the computer network.

12. The method of claim 11, dynamically changing the predetermined expiry duration according to one or more configuration messages received via the computer network.

13. The method of claim 11, further comprising:
sending the one or more alert notifications to a server via the computer network; and
in response to receiving the one or more alert notifications, determining by the server a user device associated with the appliance and sending one or more alert messages to the user device.

14. The method of claim 13, further comprising:
in response to the server receiving the one or more alert notifications, selecting by the server the user device from a plurality of user devices associated with the appliance according to a current date/time when the alert notification is received;
wherein the user device selected is a particular one of the user devices designated to receive alerts associated with the appliance during a date/time range that includes the current data/time when he alert notification is received.

15. The method of claim 11, wherein:
generating a start signal in response to a flow sensor detecting heat generation started by the appliance; and
starting the unattended timer in response to receiving the start signal from the flow sensor.

16. The method of claim 11, wherein detecting presence of the user in the proximity of the appliance is performed by a wireless receiver detecting a wireless signal transmitted by a user device within the proximity of the appliance.

17. The method of claim 11, further comprising only allowing heat generation by the appliance during one or more predetermined date/time ranges.

18. The method of claim 11, wherein:
in response to an event occurrence, controlling the control signal to disable heat generation by the appliance;
sending one or more event notifications corresponding to the event occurrence via the computer network; and
after disabling heat generation in response to the event occurrence, only controlling the control signal to reenable heat generation by the appliance in response to receiving a reset signal via the computer network.

19. The method of claim 11, further comprising:
providing a reminder device located outside the proximity of the appliance; and
upon the unattended timer being within an about-to-expire threshold of the predetermined expiry duration, controlling the reminder device to remind the user to return to the proximity of the appliance.

20. A controller for notifying remote users of lack of user presence around an appliance that is generating heat, the controller comprising one or more processors executing software instructions thereby causing the processors to performs steps of:

starting an unattended timer after heat generation is started by the appliance;

detecting presence of a user in a proximity of the appliance;

restarting the unattended timer each time the user is detected within the proximity of the appliance while heat generation by the appliance is enabled;

in response to the unattended timer reaching a predetermined expiry duration while heat generation by the appliance is enabled, generating a control signal to disable heat generation by the appliance and sending one or more alert notifications via a computer network;

starting a return timer after heat generation is disabled by the appliance;

in response to detecting the user is within the proximity of the appliance prior to return timer reaching a predetermined expiry duration, controlling the control signal to re-enable heat generation by the appliance and send one or more alert notifications via the computer network; and in response to not detecting the user is within the proximity of the appliance prior to return timer reaching a predetermined expiry duration, controlling the control signal to reenable heat generation by the appliance only in response to receiving a reset signal via the computer network.

* * * * *